United States Patent [19]
Fortin et al.

[11] Patent Number: 5,155,964
[45] Date of Patent: Oct. 20, 1992

[54] FLUFF-TYPE ORGANIC INSULATING PULP AND METHOD OF FABRICATION

[75] Inventors: Michel E. Fortin, Outremont; Andre Boisvert, St-Leon; Bernard Lemaire, Kingsey-Falls, all of Canada

[73] Assignee: Cascades Inc., Quebec, Canada

[21] Appl. No.: 663,017

[22] Filed: Mar. 1, 1991

[51] Int. Cl.$^5$ .............................. E04B 2/00; B05B 7/00
[52] U.S. Cl. ...................................... 52/743; 52/309.1; 52/404; 239/8; 162/159
[58] Field of Search ...................... 52/743, 309.1, 404; 239/8; 162/159

[56] References Cited

U.S. PATENT DOCUMENTS

| | | | |
|---|---|---|---|
| 4,134,242 | 1/1979 | Musz et al. | 52/743 |
| 4,712,347 | 12/1987 | Sperber | |
| 4,768,710 | 9/1988 | Sperber | 52/743 |
| 4,829,738 | 5/1989 | Moss | |

Primary Examiner—David A. Scherbel
Assistant Examiner—Wynn E. Wood
Attorney, Agent, or Firm—Longacre & White

[57] ABSTRACT

An insulating pulp for insulating buildings and other type structures and wherein the pulp is formed of organic fibers having a fiber length of from about 1.0 mm to 3 mm. Such pulp is obtained by a chemi-thermomechanical pulping process and the pulp may be supplied in fluff form or compressed sheet form which is later defibrillized. A fire retardant additive and a corrosive buffing agent is added to the pulp. A major characteristic of such insulating pulp is that it has a density in the range of from about 0.7 to 2.0 lbs/ft$^3$ and has an excellent thermal insulation value of about R3 to R4 per inch. The chemi-thermomechanical wood pulp is produced from debarked trees which are primarily black spruce which have these long and strong fibers. The pulp is applied by injecting it through a compressed air conduit and at the same time an adhesive is injected in the pulp to form a binding agent. Because of the property of the fibers and the fiber distribution in the fluff, the pulp is also an excellent acoustical insulator.

7 Claims, 2 Drawing Sheets

FLUFF-TYPE ORGANIC INSULATING PULP AND METHOD OF FABRICATION

FIELD OF THE INVENTION

The present invention relates to an insulating pulp for insulating buildings and other type structures and wherein the pulp is comprised of organic fibers having a fiber length of from about 1.0 mm to 3 mm and contains a fire retardant additive as well as a corrosive buffing agent. The invention also encompasses the method of producing the pulp in its fluffed form or compressed sheet form as well as the method of applying the fluff organic pulp in spaces to be insulated by an applicator machine.

DESCRIPTION OF PRIOR ART

It is known to provide insulation as loose fill material and injecting same into cavities provided in structures, and reference is made to U.S. Pat. No. 4,829,738 as an example of this. The majority of these free flowing thermal insulating materials are formed from inorganic substances which are treated with various additives having fire retardants or anti-corrosive properties. Some of the inconveniences of such loose fill insulation is that it is awkward to manipulate and transport and produces a lot of dust when disturbed, such as during the application thereof in building structures. A still further major disadvantage of such insulation is that it is difficult to get a substantially even distribution thereof in cavities which are disposed in vertical planes as the insulation has a tendency of propagating towards the bottom of the cavity by gravity. The result is that eventually the wall structures of buildings have a higher density of insulation at the bottom and minimal density or none whatsoever in the top portion thereof where the maximum amount of heat is found and escapes through the wall. In an attempt to alleviate this problem, some have suggested placing a net inside the cavity or on the face wall of the cavity such as expensive, time-consuming solution and due to the property of most insulation, and particularly its density, it is still difficult to obtain a substantially even distribution of insulation within cavities.

SUMMARY OF INVENTION

It is a feature of the present invention to provide an insulating pulp and method of manufacture as well as the method and apparatus for the application of same and which substantially overcomes the above-mentioned disadvantages of the prior art.

Another feature of the present invention is to provide an insulating pulp which is formed of organic long fibers having a fiber length of 1.0 to 3 mm and a density of 0.7 to 2.0 lbs/ft$^3$.

Another feature of the present invention is to provide an insulating organic pulp made by a CTMP pulping process and wherein the pulp is provided in fluff form or compressed sheet form, and wherein in the latter case, it is reconstituted to its fluff form before application as a loose insulation within cavities of building structures and wherein the loose insulation has much less weight per R factor value of thermal insulation and excellent acoustical properties, the thermal insulating value being in the range of from about R3 to R4 per inch.

Another feature of the present invention is to provide an insulating pulp made from organic fibers having a fiber length of from about 1.0 mm to 3 mm in fluff form and wherein the pulp is highly compressible into sheet or brick-like form or any other form suitable for injection into a defiberizing machine which is utilized on site to reconstitute the pulp in its fluff form prior to injection of same into building cavities and wherein the fluff insulation produces negligible dust.

Another feature of the present invention is to provide an organic insulating pulp which is compressed in sheet form and is defiberized on site for injection into a building structure and wherein a small supply of such sheet form pulp produces a large volume of the insulation in its fluff form.

According to the above features, from a broad aspect, the present invention provides an insulating pulp for insulating buildings and other type structures. The insulating pulp comprises organic fibers having a fiber length of from about 1.0 mm to 3 mm. A fire retardant additive, an anti-bacterial additive, and a corrosive buffing agent is added to the pulp.

Another broad aspect of the present invention is to provide an insulating pulp which is produced by a chemi-thermomechanical pulping process to produce a pulp in a fluff form and which has a density in the range of from about 0.7 to 2.0 lbs/ft$^3$ and a thermal insulating value of from about R3 to R4 per inch.

According to a further broad aspect of the present invention, there is provided a method of producing an insulating pulp for insulating buildings and other type structures and wherein the method comprises producing a chemi-thermomechanical wood pulp from debarked trees having wood fibers of a length of from about 1.0 mm to 3 mm and mixing in the pulp a fire retardant additive.

The method also envisages according to a still further broad aspect, mixing an anti-bacterial and corrosive buffing agent within the pulp.

According to a still further broad aspect of the present invention, there is provided a method of applying an insulating fluff organic pulp in a space or cavity of a building structure or other type structures to be insulated and wherein the method includes providing a fluff organic pulp having fibers of a length of from about 1.0 mm to 3 mm. The pulp is injected in a delivery conduit connected to an air compressor. An adhesive additive is injected in the pulp in the conduit in the vicinity of an ejector nozzle to form a binding agent for the fluff pulp. The fluff pulp with its binding agent is then ejected through an ejector nozzle in the space or cavity to be insulated.

According to a further broad aspect of the present invention, the fluff pulp is provided in a compressed sheet form and a portable insulating pulp applicator machine is provided for defiberizing the sheet to reconstitute the pulp in its fluff form prior to application on site.

According to a still further broad aspect of the present invention, there is provided a portable insulating pulp applicator machine for ejecting an insulating fluff organic pulp in a space of a building structure of other type structure to be insulated. The fluff organic pulp has fibers of a length of from about 1.0 mm to 3 mm. A delivery conduit is provided and has an ejector nozzle. A compressor is connected to the conduit. The conduit has a feed port for receiving a supply of the pulp. An adhesive applicator device is connected to the conduit in the vicinity of the ejector nozzle to provide a binding agent for the fluff pulp so that the fluff pulp adheres together and to surrounding surfaces of the space or cavity to be insulated.

BRIEF DESCRIPTION OF DRAWINGS

A preferred embodiment of the present invention will now be described with reference to the accompanying drawings in which:

FIG. 3 is a schematic illustration of the essential elements of a portable insulating pulp applicator machine.

DESCRIPTION OF PREFERRED EMBODIMENTS

Figure 1:
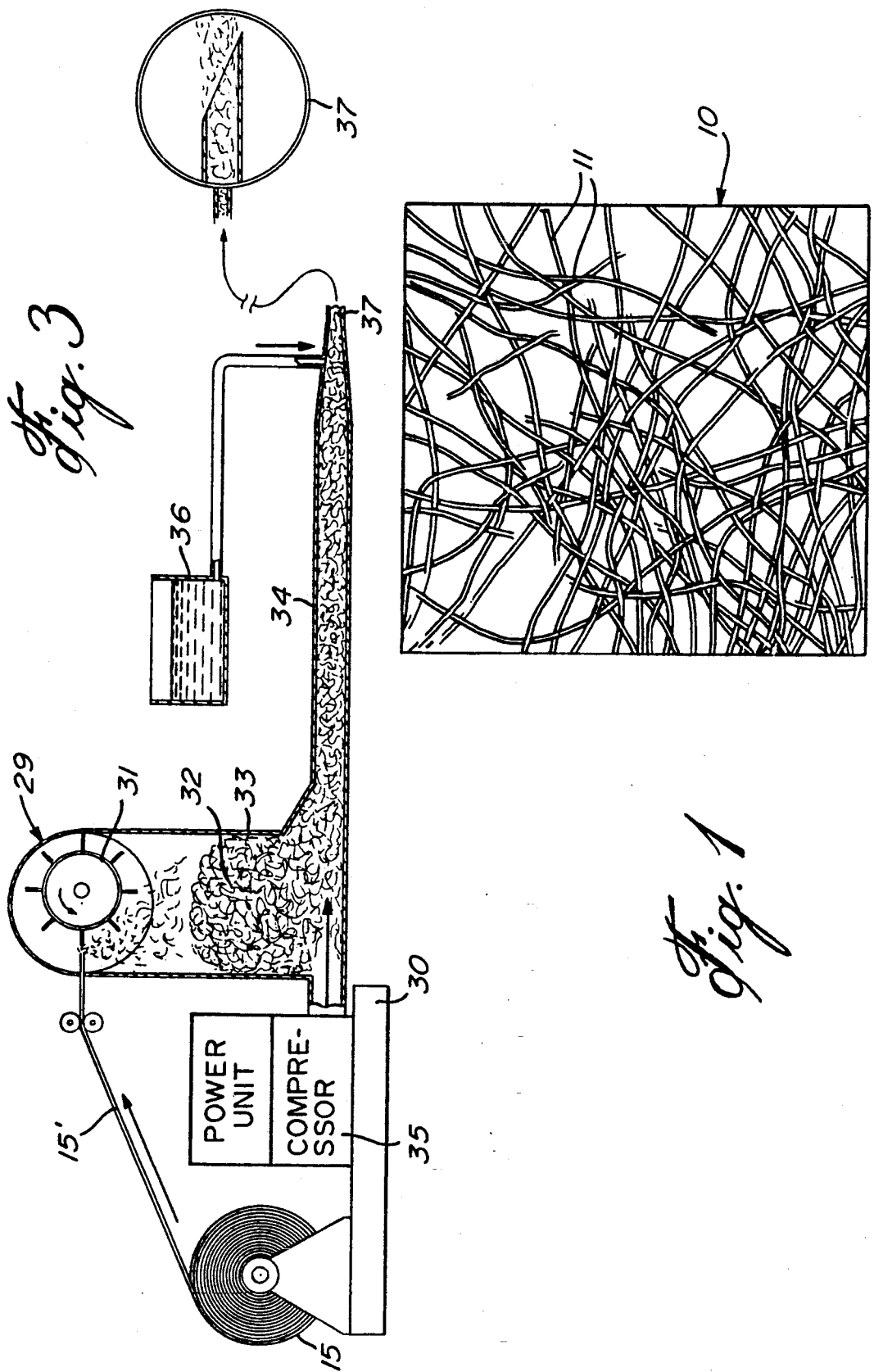
FIG. 1 is a plan view of the fiber distribution of the fluff pulp as viewed under a microscope.
Figure 2:
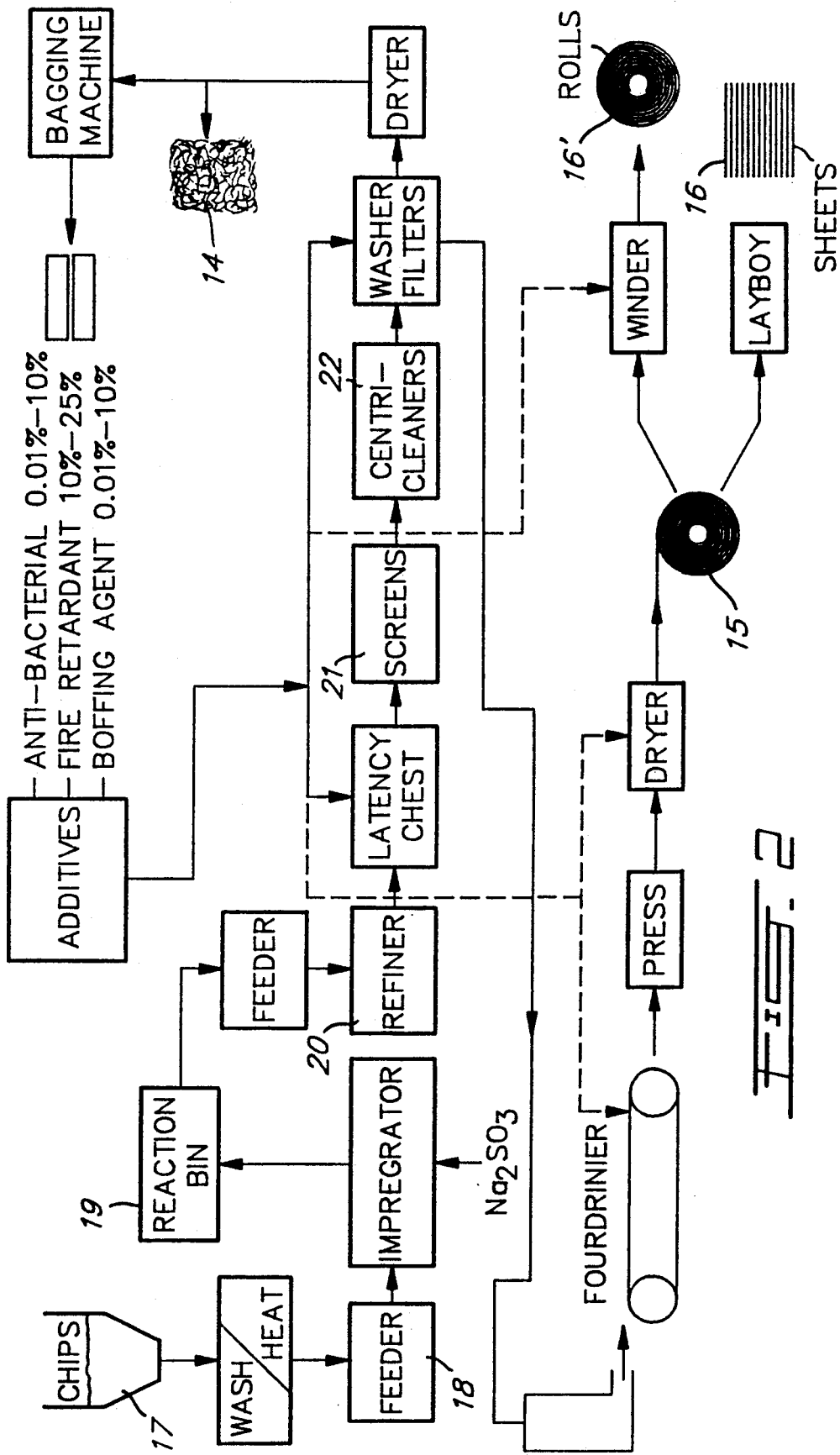
FIG. 2 is a simplified schematic illustration insulating pulp of the present invention.

Referring now to the drawings, and more particularly to FIGS. 1 and 2, there is shown a microscopic view of the organic insulating pulp 10 of the present invention and the system and process of manufacturing same. The pulp 10 is an organic wood pulp which is produced by a BCTMP, that is to say, a chemi-thermomechanical pulping process which is only schematically illustrated in FIG. 2, as such process is well known in the art for producing fluff which is utilized in sanitary products. Such process utilizes debarked trees and primarily black spruce or balsam fir or pine or a combination of two or three of these trees to provide a pulp in a fluff form. We have found, unexpectedly, that such fluff has excellent thermal insulation factor as well as good acoustical properties. It is pointed out that these trees produce wood fibers having fiber lengths of from about 1.0 mm to 3 mm and their fiber distribution, in fluff form, produces a product which has a density in the range of about 0.7 to 2.0 lbs/ft$^3$. The fibers are also hollow core fibers and when used as a thermal insulating material, it was surprisingly found to contain an insulating value of from about R3 to R4 per inch. Because of the air contained within these fibers and the fiber distribution in a fluff form, it was also found to possess excellent acoustical properties.

In order for the fibers 11 or the fluff to be used as an insulating material, it is necessary to modify the pulping process to add a fire retardant additive, an anti-bacterial additive, as well as a corrosive buffing agent, as illustrated in FIG. 2. The fire retardant additive is added in the range of about 10 to 25% by weight of the pulp and the anti-bacterial additive is added in the range of from about 0.1% to 10% by weight depending on the intended use of the insulation. The corrosive buffing agent is also in this range of 0.01 to 10% and also depending on the intended use of the product.

As shown in FIG. 2, the insulating pulp may be provided at the output of the CTMP pulp process 13 in a fluff pulp form 14 where the fluff is then sent to a bagging or packaging machine to produce bags of fluff insulation. As also shown in FIG. 2, the pulp can also be provided in a compressed sheet form to produce a roll 15 of an insulating pulp sheet having the above-described fiber characteristics. The roll can then be cut in individual sheet form 16 to form stacks of sheets or rolls 16' which are easy to transport so that a large quantity of insulating fluff pulp can be transported by a very small vehicle and occupying very little space on site. It is also pointed out that since about half the volume of this pulp can provide comparable insulating factors as with ordinary loose fill insulation or glass fiber insulation, much less material is utilized in building structures making them more lightweight. The lightweight characteristic as well as the compressed sheet form characteristic of the product is also of major importance to insulating contractors.

Hereinbelow are Tables illustrating the sheet properties and the fiber properties of the insulating pulp of the present invention.

| Properties | | Minimum | Maximum |
|---|---|---|---|
| SHEET PROPERTIES | | | |
| Basis weight (Gr/M$^2$) | | 300 | 900 |
| Moisture (%) | | 5.0 | 15.0 |
| Kamas energy (Wh/Kg) | | 40.0 | 120 |
| Burst (Kpaxm$^2$/Gr) | | 1.0 | 3.0 |
| Bulk (Cm$^3$/Gr) | | 2.0 | 4.0 |
| Breaking Length (Cm$^3$/Gr) | | 2.0 | 6.0 |
| Tear (Mnxm$^2$/Gr) | | 6.0 | 15.0 |
| Freeness (CFS) | | 150 | 700 |
| FIBER PROPERTIES | | | |
| Fiber length (mm) | | 1.0 | 3.0 |
| Brightness (ISO) | | 50.0 | 80.0 |
| DCM extract (%) | | 0.05 | 10.0 |
| Fiber Classification | R14 | 5.0 | 40.0 |
| by Bauer McNett | 14/28 | 15.0 | 40.0 |
| Classificator (%) | 28/48 | 30.0 | 13.0 |
| | 48/100 | 10.0 | 5.0 |
| | 100/200 | 10.0 | 1.0 |
| | P200 | 30.00 | 1.0 |
| Shives (%) | | 0.05 | 10% |
| Knots (%) | | 2.0 | 20% |
| Wood Species - | Confiner Black spruce | 0 | 100% |
| | Balsam fir | 0 | 100% |
| | Pine | 0 | 100% |

In summarizing the characteristic of the fluff insulating pulp of the present invention, it is produced by a CTMP pulping process utilizing wood chips having the above-referred to fiber characteristics. The conventional chemi-thermomechanical wood pulp process is modified wherein to mix in the necessary additive to produce a fluff pulp having proper insulation characteristics as required by building codes. The mill's wood supply for the process is mainly black spruce and balsam and these are characterized as having a very slow growth rate and produce extremely strong, long fibers which we have surprisingly found to produce a fluff pulp insulation which has excellent insulating properties which were heretofore unknown.

Briefly summarizing the PCTMP modified pulping process, with reference specifically to FIG. 2, wood chips 17 are produced from logs of about 2.4 meters of black spruce and balsam, usually 80% spruce and 20% balsam and these chips contain usually a maximum of 0.5% residual bark. These chips are heated to 35° C. using steam and are washed using fresh water which is heated to 60°-70° C. The chips are separated from the wash water and are heated to 90° C. in a bin. The chips are compressed into a plug screw feeder 18 to remove air and help in the absorption of the sodium sulphite solution in the impregnator. Usually, 1-6% of Na$_2$SO$_3$ by weight of the chips is utilized. The sodium sulphite is produced as follows:

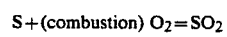

$S + (\text{combustion}) \, O_2 = SO_2$

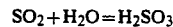

$SO_2 + H_2O = H_2SO_3$

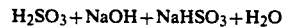

$H_2SO_3 + NaOH + NaHSO_3 + H_2O$

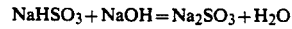

$NaHSO_3 + NaOH = Na_2SO_3 + H_2O$

The PH of the Na SO solution is 9.0 to 10.0.

In the reaction bin 19, the sodium sulphite solution reacts with the lignin (sulphonation) at a temperature of 95° C. for about 30 minutes. The chips are pressurized using the plug screw feeder and the pressure is raised to about 35 psi.

In the feeder, the chips are pressurized to about 35 psi and the refined pulp is separated from steam in the refiner 20 which is also 35 psi and pumped into a latency chest where the pulp is agitated at 60° C. to remove the latency in the pulp. The pulp is then screened using two stages of pressure screens schematically illustrated at 21 with the accepted pulp from the screens being passed through two stages of centricleaners as illustrated at 22. The rejected pulp from the screens and the cleaners, which is about 30% of the total feed, is thickened, refined in a reject refiner, screened and cleaned in an independent reject treatment system (not shown). The pulp from the centricleaners is then washed and thickened in a disc filter and inclined screens by water displacement at a temperature of 60° C. The pulp is then stored and when it is pumped out, the pH is adjusted at 7.0 using sulphuric acid.

The insulating pulp, in sheet form, is illustrated at 15 and is produced on a fourdrinier machine, well known in the art. Pressing and drying follows to drop the moisture content to about 10%. The rolls 15 of this insulating fiber sheet can then be sent to a winder or layboy which cuts the rolled sheet into different widths and other desirable sheet and roll forms (16 and 16').

The slimecide anti-bacterial additive may be applied at two positions within the process, one position being located at the output of a high density tower and the other in the wire pit where the white water is reserved for the pulp machine, these positions being well known to a person skilled in the art and knowledgeable of CTMP pulping process. The buffing agent should be injected in the system at the high density tower to be sure that the cure time is long enough. The fire retardant additive, herein borax, and other substitute additives can also provide excellent results, is added at a location where the concentration of the product can be controlled with high precision and there are a variety of other positions within this process and, ideally, the application can be done in the third press, the breaker stack-in or the breaker stack-out, the reel drum, or the winder section. This fire retardant liquid can be applied by a spray boom which is positioned over the pulp.

Referring now to FIG. 3, there is schematically illustrated a portable applicator machine for the insulating pulp of the present invention. If the roll 16' of compressed organic insulating fluff pulp is provided, such roll, or individual sheets 16, can be supported on a mobile platform 30 which is transportable by vehicle directly to the site with the sheet 16 or 16' of compressed pulp fibers being fed to a fibrillizer machine 29 where a fibrillizing means such as the rotating hammers 31 reconstitute the compressed pulp into its loose fluff form as shown at 32. The pulp falls into a feed bin 33 where it is fed into a blowing line 34 by compressed air from a compressor 35. A glue tank 36 feeds a supply of glue into an applicator nozzle 37 where the glue is mixed with the fluff pulp to provide a binding agent so that the fluff pulp adheres together and to surrounding surfaces of a space or cavity to be insulated. As shown in the exploded view, the ejector 37 may have a rectangular wedge shape so as to be used to puncture permeable non-woven tissues which are provided in wall structures whereby to form slits therein to provide openings for the evacuation of air and also to permit insertion of the nozzle within the cavity. Usually, when insulating walls of a building structure, a polyethylene sheet is positioned on the inside open surface between the studs and the sheet is slit to provide for the evacuation of air when insulation is injected under pressure. The use of clear polyethylene also provides a visual means to the person applying the insulation to ascertain that insulation is positioned everywhere in the space covered by the plastic sheet.

Although FIG. 3 shows a fibrillizer fed by a roll of compressed insulating pulp of the present invention, the machine can also be adapted to fibrillize individual sheets of compressed insulating pulp. The provision of the pulp in sheet form has many advantages, such as making it easily storable for retail by lumber or hardware suppliers, makes it easy to manipulate due to its light weight and to transport, occupies minimum storage area as compared with glass fiber batts, produces very little dust, and most of all, eliminates the problem of having to transport large packages of insulation. A small package of sheets of the compressed pulp of the present invention may be sufficient to insulate an entire home, let alone a single room thereon.

It is within the ambit of the present invention to cover any obvious modifications of the preferred embodiment describe herein, provided such modifications fall within the scope of the appended claims.

We claim:

1. A method of applying an insulating fluff organic pulp in a space of a building structure or other type structures to be insulated, said method comprising:
    i) providing a sheet of compressed organic pulp having fibers of a length falling within a predetermined range and
    ii) feeding said sheet in a fibrillizing device to produce a fluff organic pulp; and
    iii) injecting said fluff organic pulp in a delivery conduit connected to an air compressor;
    iv) injecting an adhesive additive in said pulp in said conduit in the vicinity of an ejector nozzle to form a binding agent for said fluff pulp; and
    v) injecting said fluff pulp through said nozzle in said space.

2. A method as claimed in claim 1 wherein said step (i) comprises providing a roll of said sheet, and continuously feeding said sheet to said fibrillizer device in response to said fluff being ejected through said nozzle, said fibers being of a length of from about 1.0 mm to 3 mm.

3. A portable insulating pulp applicator machine for ejecting an insulating fluff organic pulp in a space of a building structure or other type structures to be insulated, said organic pulp being compressed to form a sheet, said pulp having fibers of a length falling within a predetermined range, a fibrillizer device to receive said sheet of pulp in compressed form for fibrillizing said sheet into said fluff organic pulp, a delivery conduit having an ejector nozzle, a compressor connected to said conduit, said conduit having a feed port for receiving a supply of said fluff organic pulp, and an adhesive applicator device connected to said conduit in the vicinity of said ejector nozzle to provide a binding agent for said fluff organic pulp so that said fluff organic pulp adheres together and to surrounding surfaces of said space to be insulated.

4. A portable insulating pulp applicator machine as claimed in claim 3 wherein said sheet is in the form of a supply roll and fed to said fibrillizer device by feed rolls.

5. A portable insulating pulp applicator machine as claimed in claim 3 wherein said fluff organic pulp is a chemi-thermomechanical pulp having a fire retardant additive, an antibacterial additive and a corrosive buffing agent.

6. A portable insulating pulp applicator machine as claimed in claim 3 wherein said fluff organic pulp has fibers of a length of from about 1.0 mm to 3 mm and a density in the range of from about 0.7 to 2.0 lbs/ft$^3$.

7. A portable insulating pulp applicator machine as claimed in claim 6 wherein said fluff organic pulp has a thermal insulating value of from about R3 to R4 per inch.

* * * * *